United States Patent
Fiege et al.

(10) Patent No.: US 10,997,061 B2
(45) Date of Patent: May 4, 2021

(54) METHOD FOR EXECUTING A PROGRAM IN A COMPUTER

(71) Applicant: SIEMENS AKTIENGESELLSCHAFT, Munich (DE)

(72) Inventors: Ludger Fiege, Grafing (DE); Joachim Fröhlich, Kirchseeon (DE); Stefan Rothbauer, Augsburg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/636,096

(22) PCT Filed: Jul. 31, 2018

(86) PCT No.: PCT/EP2018/070654
§ 371 (c)(1),
(2) Date: Feb. 3, 2020

(87) PCT Pub. No.: WO2019/025395
PCT Pub. Date: Feb. 7, 2019

(65) Prior Publication Data
US 2020/0183819 A1 Jun. 11, 2020

(30) Foreign Application Priority Data
Aug. 3, 2017 (EP) .................................... 17184700

(51) Int. Cl.
*G06F 11/00* (2006.01)
*G06F 11/36* (2006.01)
*G06F 8/41* (2018.01)

(52) U.S. Cl.
CPC .......... *G06F 11/3688* (2013.01); *G06F 8/441* (2013.01); *G06F 11/3664* (2013.01); *G06F 11/3692* (2013.01)

(58) Field of Classification Search
CPC .. G06F 8/441; G06F 11/3664; G06F 11/3688; G06F 11/3692
See application file for complete search history.

(56) References Cited

U.S. PATENT DOCUMENTS

| 8,671,394 B1 * | 3/2014 | Taillefer | G06F 11/3664 |
| | | | 717/125 |
| 2009/0249301 A1 | 10/2009 | Kalla | |

(Continued)

OTHER PUBLICATIONS

European Decision to Grant for European Patent Application No. 17184700.7 dated Sep. 10, 2020.

(Continued)

*Primary Examiner* — Joshua P Lottich
(74) *Attorney, Agent, or Firm* — Lempia Summerfield Katz LLC

(57) ABSTRACT

A method for memory modification resulting in a test probe for examining a program under test substantially during run-time is provided. The ability to inject faults or errors in order to test a reaction of the program to a fault in a particular state and to individually replace access to a regular operand by accessing a shadow operand allow for non-intrusive tests while the program is substantially executed in real-time. The program itself is not substantially altered for testing purposes.

11 Claims, 10 Drawing Sheets

(56) References Cited

U.S. PATENT DOCUMENTS

| 2010/0281303 A1* | 11/2010 | Cates | G06F 11/3688 |
| | | | 714/33 |
| 2014/0007054 A1* | 1/2014 | Wu | G06F 11/3604 |
| | | | 717/124 |
| 2016/0299836 A1* | 10/2016 | Kuhn | G06F 11/3676 |

OTHER PUBLICATIONS

European Search Report for European Patent Application No. 17184700.7-1221 dated Mar. 31, 2018.
PCT International Search Report and Written Opinion of International Searching Authority dated Oct. 16, 2018 corresponding to PCT International Application No. PCT/EP/2018/070654 filed Jul. 31, 2018.
Ziade, Haissam, Rafic A. Ayoubi, and Raoul Velazco. "A survey on fault injection techniques." Int. Arab J. Inf. Technol. 1.2 (2004): 171-186.

* cited by examiner

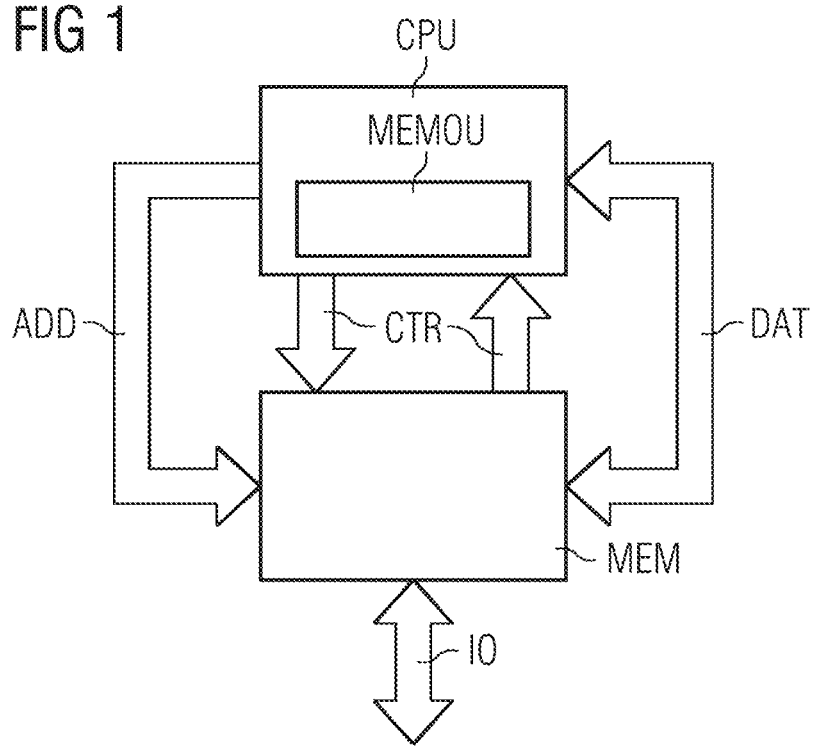
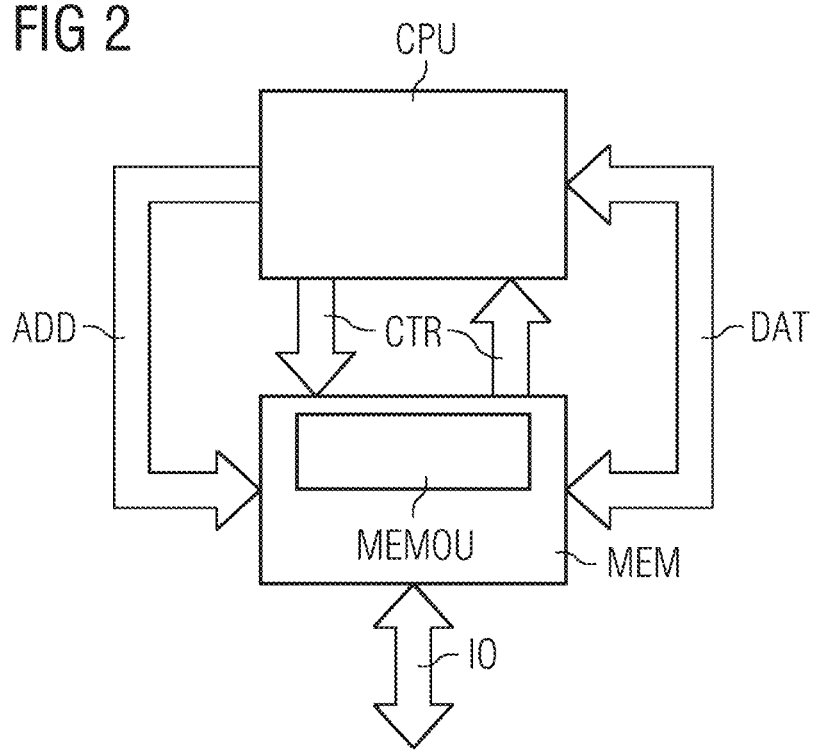

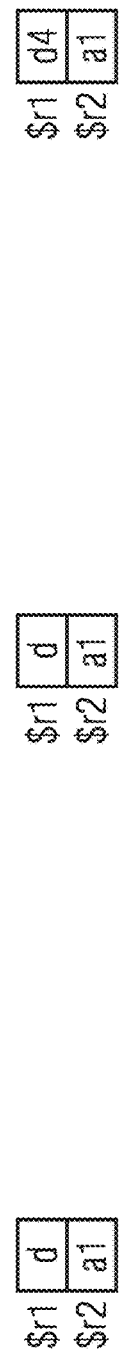
FIG 11
FIG 12

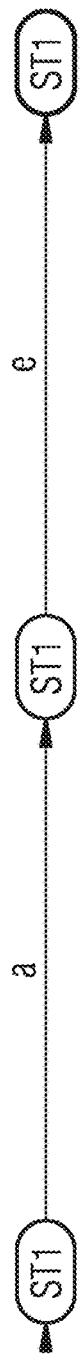
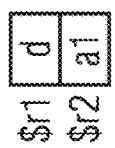
FIG 13
FIG 14

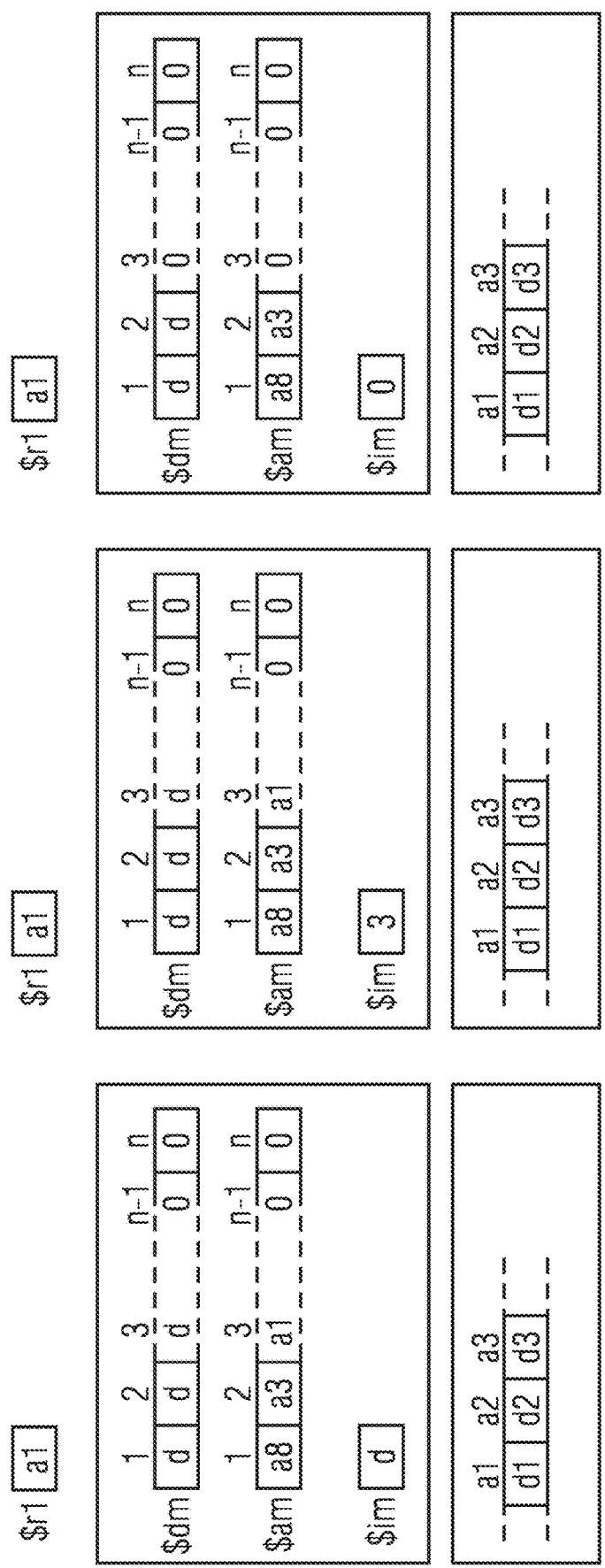

METHOD FOR EXECUTING A PROGRAM IN A COMPUTER

This application is the National Stage of International Application No. PCT/EP2018/070654, filed Jul. 31, 2018, which claims the benefit of European Patent Application No. EP 17184700.7, filed Aug. 3, 2017. The entire contents of these documents are hereby incorporated herein by reference.

TECHNICAL FIELD

The disclosed embodiments relate to a method for executing a program in a computer and, specifically, to a method for manipulating a program during execution in order to allow for a testing of said program.

BACKGROUND

In order to provide a proper operation of program (e.g., particularly programs executed on an embedded system with real time requirements), rigorous testing is to be performed in the course of developing and engineering such programs.

Currently employed tools for software testing include external devices that depend on stimuli for indicating the state of a program being executed on a processing unit of a computer. In the course of testing, faults or errors are injected in response to the stimuli to test a reaction of the program to a fault in that particular state.

A particular problem with external test devices (e.g., devices outside and/or in a vicinity of a processing unit) is due to an integration and miniaturization of components and signals in current processing systems that render difficulties in reaching information of interest (e.g., cache-memory, internal registers and buses, and other on-chip logic of a processing unit). Due to a limited pin count, a tapping of internal signals of interest is rather intricate.

Such testing is particularly demanding in the case of real-time systems and/or embedded systems that include highly integrated components and where test results are to be obtained without compromising a functional and timing behavior.

Running a program under control of a debugger (e.g., a tool for finding causes of errors) and modifying the program by setting watch points or break points massively interferes functional and timing behavior, which makes debuggers impractical for automated testing.

In general, stimulations for testing purposes are not to impair the program under test. In other words, process-internal stimulations are to only have the intended effects on the control process under test, without any unintended side effects. In this sense, process-internal stimulations are to be non-intrusive.

Accordingly, there is a need for executing a program in a computer allowing for non-intrusive tests while the program is substantially executed in real-time and whereby the program itself is not substantially altered for testing purposes.

Further, there is a need for facilitating tests in programs by injecting faults at precise locations in the execution path of a program.

SUMMARY AND DESCRIPTION

The present embodiments relate to a method for executing a program in a computer, the program including a number of instructions to be executed by a processing unit of the computer, the method comprising: a) allocating a first memory structure for storing at least one operand of the program, wherein each operand is stored in a first memory cell by an associated first address in the first memory structure; b) allocating a second memory structure for storing at least one shadow operand, wherein each shadow operand is stored in a second memory cell by an associated second address in the second memory structure; c) loading one of the instructions for accessing a first memory cell by an associated first address; d) querying a presence of the first address in the second memory structure and, responsive to a positive presence, using an associated second address for accessing a second memory cell of one of the second memory cells instead of the first memory cell.

The present embodiments provide a technique for coordinating execution of instructions in a processor allowing for individually replacing an access to a regular operand by accessing a shadow operand instead. The concept of a shadow operand allows for non-intrusively seeding data into the execution of the program, particularly for the purpose of injecting faults into the normal program operation and testing the reaction of the program.

On occurrence of a regular instruction for accessing a first memory cell, which is an addressed location for reading or storing the operand, by a first address, data instructive of reading or writing a shadow operand is queried.

In case this query delivers a positive presence, an associated second memory cell dedicated for the shadow operand is used for access instead of the first memory cell for the regular operand.

As the instruction of accessing a first memory cell by an associated first address includes both, reading or writing an operand, the method allows for both: reading a shadow operand instead of a regular operand; or writing a variable into the second memory cell dedicated for a shadow operand instead writing the variable into the regular first memory cell.

The first alternative, reading a shadow operand instead of a regular operand, is advantageous for injecting faults to the normal program execution, for example, in that a value that is expected to cause an error is intentionally injected by the shadow operand in order to examine the reaction of the program. The second alternative, writing a variable into a memory cell dedicated for a shadow operand, is advantageous for dumping variables of interest into the second memory structure (e.g., for the purpose of analyzing these variables in the aftermath of a fault injection).

BRIEF DESCRIPTION OF THE DRAWINGS

FIG. 1 shows a block diagram of an exemplary architecture according to an embodiment;

FIG. 2 shows a block diagram of an exemplary architecture according to an alternative embodiment;

FIG. 9 shows details of a third state transition;

FIG. 10 shows amendments in a memory structure as a result of the third state transition;

FIG. 11 shows details of a fourth state transition;

FIG. 12 shows amendments in a memory structure as a result of the aforementioned fourth state transition;

FIG. 13 shows details of a fifth state transition;

FIG. 14 shows amendments in a memory structure as a result of the fifth state transition;

FIG. 17 shows details of a seventh state transition;

FIG. 18 shows amendments in a memory structure as a result of the seventh state transition;

DETAILED DESCRIPTION

Figure 3:
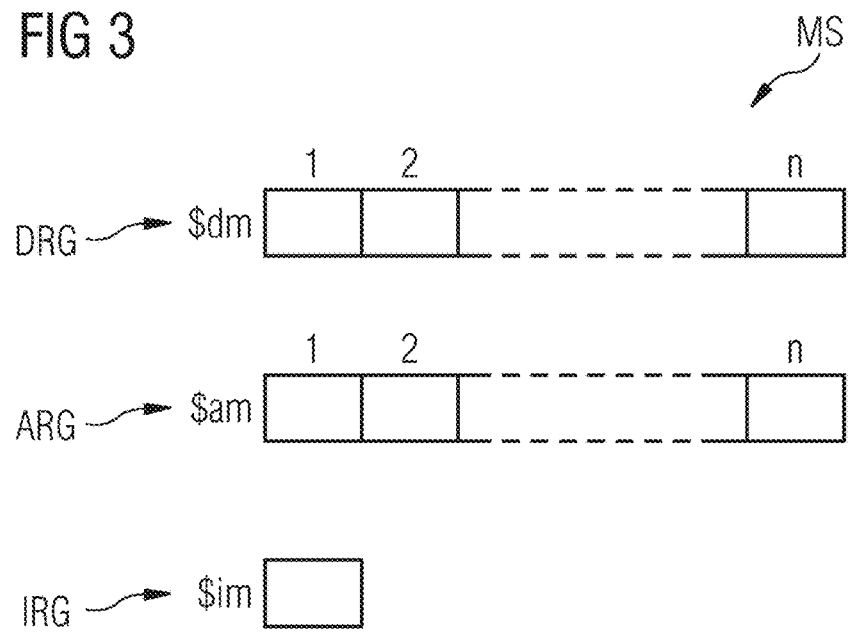
FIG. 3 shows an exemplary memory structure according to an embodiment.

FIG. 1 shows a block diagram of an exemplary architecture including a central processing unit CPU such as a microprocessor or a microcontroller.

The central processing unit CPU exchanges (e.g., loads or saves) data with a main memory MEM. The exchange of data may include storage addresses ADD, data values DAT, and control data CTR.

Control data CTR may include machine code instructions of one or more computer programs stored in the main memory MEM. An instruction is a group of bits causing the central processing unit CPU to perform a specific operation. A leading portion of an instruction includes an operation code or opcode. The opcode is a group of bits that specify an operation to be performed by the central processing unit CPU. For example, operations such as adding, or subtracting, or branching program execution or storing a value to memory may be specified in the opcode. The remainder of the instruction typically provides data sources, data destinations, and/or direct data, for the operation, called operands. Operands may be specified within the instruction itself or in a memory location.

Data values DAT may include operands and symbolic names associated with an operand having an associated value that may be subject to change.

Addresses ADD are used for executing instructions and for storing and retrieving data. While a concept of physical addresses may be applied by machine code operands for addressing memory locations, logical or virtual addresses are used under a control of a memory management unit or other memory mapping facilities (not shown). The facilities are included within or controlled by the central processing unit CPU.

Further units or devices (not illustrated in the drawing) may exchange input/output data IO with the main memory MEM with or without the central processing unit CPU.

Although the exchange of data is illustrated by separate lanes or busses (depicted by double arrows in the drawing), such exchange may include alternative organizations of data exchange including solely one or more common data lanes.

Generally, the central processing unit CPU, which supervises and implements various data processing tasks, contains hardware components for processing instructions and data. Instructions together with data are typically stored in a memory structure. The memory structure may be physically separate from the central processing unit CPU, mainly including the main memory MEM, although copies of instructions and data may be temporarily stored within the microprocessor during program execution.

To this end, the central processing unit CPU may include or administer at least one further memory structure (not shown) that is commonly referred to as a register or a processor register. A register is a quickly accessible location available to the central processing unit CPU. Registers may include a small amount of fast storage and are typically addressed by mechanisms other than the main memory MEM, but may in some cases be memory mapped.

A common property of computer programs is locality of reference, which refers to accessing the same values repeatedly and holding frequently used values in registers in order to improve performance. This makes fast registers or caches meaningful. Allocating frequently used variables to registers may be critical to performance of a program. This register allocation is, therefore, usually performed by a compiler in the code generation phase.

A register may hold an instruction, a storage address, or any kind of data such as a bit sequence or individual characters. Some instructions specify registers as part of the instruction. For example, an instruction may specify that the contents of two defined registers be added together and then placed in a specified register. Depending on the processor design and language rules, registers may be numbered or have arbitrary names.

A computer program (not shown) is provided to be executed by the central processing unit CPU. The program is subject to be examined substantially during run-time with the ability to inject faults or errors in order to test reaction by the program to a fault in that particular state. Embodiments provide for coordinating execution of instructions in the central processing unit allowing for individually replacing an access to a regular operand by accessing a shadow operand instead.

Embodiments provide for writing a computed variable into a memory cell dedicated for the shadow operand related to a respective operand (e.g., for the purpose of analyzing the computed variable in the aftermath of a fault injection).

FIG. 1 further shows a memory modification unit MEMOU having functionality described in detail hereinafter. The memory modification unit MEMOU may include or use one or more memory structures including registers of the central processing unit CPU and/or memory structures within the main memory MEM. According to the embodiment of FIG. 1 the memory modification unit MEMOU is either located within the central processing unit CPU or at least using registers of the central processing unit CPU.

Two implementations of the memory modification unit MEMOU are suitable: The memory modification unit MEMOU may include one or more processor-internal or -external hardware components allowing for a modification of memory cells of the computer program to be tested when instructed to do so. The hardware components may either include register components delimited from the registers administered by the central processing unit or may use register components of the central processing unit CPU. The memory modification unit MEMOU may include software that is compiled and linked together with the computer program to be tested. The software memory modification unit MEMOU includes routines for allocating a delimited memory structure, providing for registers or other memory cells under the control of the memory modification unit MEMOU. The software memory modification unit MEMOU may further amend the microcode of the central processing unit CPU by particular instructions for accessing shadow operands and/or extend existing instructions for accessing operands.

A person or ordinary skill in the art will readily choose an implementation based on the requirements of the task at hand.

An alternative embodiment of the memory modification unit MEMOU depicted in FIG. 2, where like parts are designated by like reference signs throughout, differs, for example, from the embodiment of FIG. 1 in that the memory modification unit MEMOU is located within the main memory MEM instead of the central processing unit CPU. It will be apparent hereinafter, however, that the memory modification unit MEMOU is more than a delimited memory structure.

In the following, an embodiment according to FIG. 1 where the memory modification unit MEMOU is included in hardware portions of the central processing unit CPU and/or included in the program executed on the central processing unit CPU is described. The behavior of instructions of the memory modification unit MEMOU and their effects on registers administered by the memory modification unit MEMOU are defined by state transition diagrams.

The memory modification unit MEMOU provides for an allocation of a second memory structure that is operated in parallel with a first memory structure used by the program under test (e.g., in the embodiment of FIGS. 1 and 3, one or more registers included within or administered by the central processing unit CPU.

On the occurrence of a program's instruction for accessing an operand (e.g., reading an operand from the first memory structure or writing an operand into the first memory structure), the shadow operand is accessed under definable conditions instead of the operand.

FIG. 3 shows an exemplary second memory structure MS according to an embodiment. The second memory structure MS provides three registers DRG, ARG, IRG within a register space of the central processing unit CPU, which are exclusively administered by the memory modification unit MEMOU.

Further (not shown) registers r1 and r2 denote registers allocated in the register space of the central processing unit CPU that are regularly used by the program under test. The contents saved within a register, or generally, a memory cell, are referred to by a preceding sign »$«. Accordingly, the contents or the value saved in register r1 are expressed by $r1.

A data register DRG is provided for access to shadow operands. FIG. 3 shows n data memory cells having contents that are denoted by a concatenation of a type identifier $dm and an index number (e.g., $dm1, $dm2, . . . , $dmn). In each of the n data memory cells in the data register DRG, a respective shadow operand $dm1, $dm2, . . . , $dmn may be saved or be retrieved. Hereinafter, the shadow operand is also referred to as modified data value in order to express a modified nature compared to the original operand.

An address register ARG is provided to store modified addresses of modified data memory cells. FIG. 3 shows n data memory cells having contents that are denoted by a concatenation of a type identifier $am and an index number (e.g., $am1, $am2, . . . , $amn). In each of the n address memory cells in the address register ARG a respective address of a modified data value $am1, $am2, . . . , $amn may be saved or be retrieved.

A modification indication register IRG is provided to store a modification indicator $im with the following values: A value of 0 (zero) identifies an unmodified memory cell; or a value in the range of the indexes 1, . . . , n, or, synonymously, positions i identifies a memory cell $ami (1<i<n) modified at a given time.

The following instructions are defined for accessing, querying or administering a shadow operand by the memory modification unit MEMOU: A first instruction entitled »store modified« as follows: stm $r1, $r2 is used to store a shadow operand or a modified data value to a memory cell in the second memory structure. The instruction with an opcode »stm« includes two operands specifying the contents $r1 and $r2 of a respective register r1 and r2 in the first memory structure used for normal operations of the program under test. The »store modified« instruction stores a data value of the shadow operand currently cached in the first register r1 to a memory cell of the second memory structure having an address that is currently cached in the second register r2.

A second instruction entitled »load modified« as follows: ldm $r1, $r2 is used to load a shadow operand or modified data value from a memory cell of the second memory structure into a memory cell of the first register $r1 used for normal operations of the program under test. The shadow operand is loaded from a memory cell of the second register having a specific address that is passed to the load instruction by a value currently cached in the second register $r2.

A third instruction entitled »is modified« as follows: ism $r1 is used to determine whether a shadow operand is provided at a given specific address of a memory cell in the second memory structure. The specific address is passed to the »is modified« instruction by a value currently cached in the first register $r1.

A fourth instruction entitled »clear modification« as follows: clm $r1 is used to clear an »is modified« state for a given specific address of a memory cell in the second memory structure, having a specific address that is passed to the »clear modification« instruction by a value currently cached in the first register $r1.

Hereinafter, these instructions along with corresponding effects on register contents are defined by a state transition diagram shown in FIG. 4 for illustrating possible state transitions.

The state transition diagram defines two states ST1, ST2 wherein a first state ST1 is characterized in that a memory cell at a given address addr is not modified. In other words, there is no shadow operand for a given operand stored in a given address. A second state ST2 is characterized in that a memory cell at a given address addr is modified. In other words, there is a shadow operand for a given operand stored in a given address. In the first state ST1, a query by the »is modified« instruction ism addr would return a value of zero, which is the contents of the modification indication register IRG. In the second state ST2, a query by the »is modified« instruction ism addr would return a value unequal to zero.

The above described instructions for accessing or administering a shadow operand (e.g., » store modified« or stm, »load modified« or ldm, »is modified« or ism, and »clear modification« or clm) and their interplay with usual memory instructions (e.g., »store« or st and »load« or ld) are influencing a state transition a, b, c, d, e, f, g, as explained below.

The latter »usual« memory instructions refer to general instructions of accessing memory by the program under test.

All instructions refer to a given adress addr that is passed as an operand addr for the given opcode of the instructions explained below.

a) A first state transition a remaining in the first state ST1 is effected by the instruction ism addr, where ism is the instruction of querying whether a shadow operand is provided at a given specific address addr of a memory cell in the second memory structure.

b) A second state transition b remaining in the second state ST2 is effected by the instruction ism addr, where ism again is the instruction of querying whether a shadow operand is provided at a given specific address addr of a memory cell in the second memory structure. Unlike to the first state transition, the second state transition assumes a situation (e.g., the second state ST2), where a shadow operand is present.

c) A third state transition c is changing into the second state ST2 (see the outer bow in the drawing) or remains in the second state ST2 (see the inner loop in the drawing). This third state transition c is effected by the instruction stm, addr, where stm is the instruction for storing a shadow operand or modified data value to a memory cell in the second memory structure. The instruction with an opcode »stm« includes two operands, wherein the first operand is characterized by a place holder, which provides that the first operand, a data value of the shadow operand, does not affect the outcome of the instruction. The second operand of the stm instruction specifies the address addr of a memory cell in the second memory structure in which the shadow operand is to be stored.

d) A fourth state transition d remaining in the second state ST2 is effected by the instruction ldm, addr, where ldm is the instruction for loading a shadow operand or modified data value from a memory cell of the second memory structure specified by the second argument addr into a memory cell of a register with an address specified by the first argument (e.g., by a placeholder) since the address of the memory cell in the first memory structure does not affect the outcome of the instruction (e.g., used for normal operations of the program under test).

e) A fifth state transition e remaining in the first state ST1 is effected by the instruction ld, addr, wherein ld is the »usual« instruction in normal operations of the program under test for loading an operand from a memory cell of the first memory structure. By using this load instruction ld, no consideration of a potentially present shadow operand is taking place. The source address addr of the memory cell from which the operand is to be loaded is specified by the second argument addr. The first argument of the load instruction ld is specified by a placeholder since the target address of the load instruction does not affect the outcome of the instruction.

f) A sixth state transition f remaining in the first state ST1 is effected by the instruction st, addr, where st is the »usual« instruction in normal operations of the program under test for storing an operand to its own register (e.g., to a memory cell of the first memory structure). By using this store instruction st, no consideration of a potentially present shadow operand is taking place. The target address addr of the memory cell into which the operand is to be stored is specified by the second argument addr. The first argument of the store instruction st is specified by a placeholder since the source address of the store instruction does not affect the outcome of the instruction.

g) A seventh state transition g is changing into the first state ST1 (see the outer bow in the drawing) or remains in the first state ST1 (see the inner loop in the drawing). This seventh state transition g is effected by the instruction clm addr, where clm is the instruction for clearing an »is modified« state for a memory cell in the second memory structure, having a specific address addr that is passed to the »clear modification« instruction.

Further state transitions x,y (in the drawing, illustrated by a crossed-out loop) are disabled: x) A state transition x remaining in the first state ST1 would be effected by the instruction ldm, addr This state transition x (e.g., disabled state transition) would load a modified value for a memory cell that has not been modified: the first state ST1 is defined by a memory cell at address addr that is not modified. Hence, this operation has no effect.

y) A state transition y remaining in the second state ST2 would be effected by the instruction ld, addr This state transition y (e.g., disabled state transition) would try to load an unmodified value for a memory cell that has been modified: the second state ST2 is defined by a memory cell at address addr is modified. If permitted, this operation would foil the semantics of the memory modification unit MEMOU (see also definitions of state transitions d and e).

In the following, details of state transition a,b,c,d,e,f,g are shown along with amendments in the first memory structure and the second memory structure as a result of the respective state transition.

Figure 5:
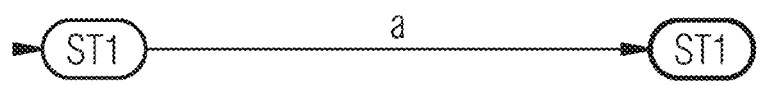
FIG. 5 shows details of a first state transition.

FIG. 5 shows details of the first state transition a in the course of executing the »is modified« instruction. The first state transition a is starting in a first state ST1, in which a memory cell at a given address is not modified. Alternatively, in other words, there is no shadow operand for a given operand stored in a given address. Accordingly, an »is modified« instruction query will deliver a value of 0 (zero) meaning that no shadow operand is present. The »is modified« instruction, consequently, does not lead to a state transition. The state remains unaltered at the first state ST1.

Figure 6:
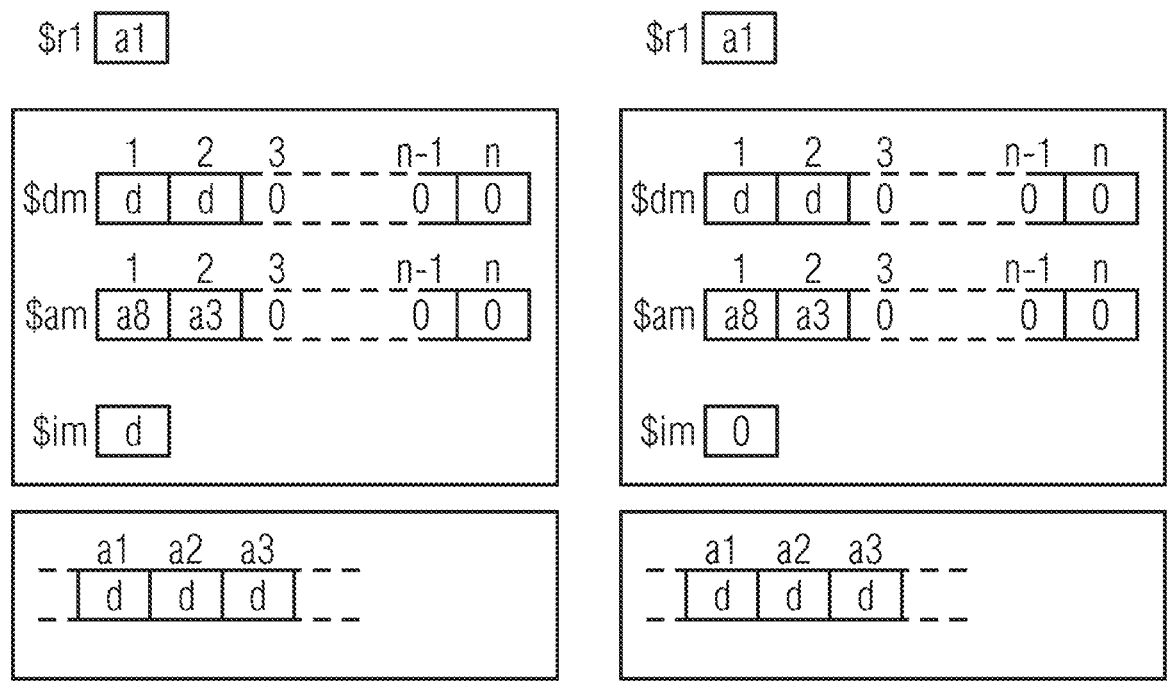
FIG. 6 shows amendments in a memory structure as a result of the aforementioned first state transition.

FIG. 6 shows amendments in memory structures before (left section) and after (right section) the first state transition a depicted in the subsequent FIG. 5.

In the upper part of both sections the contents of a memory structure for program execution are shown (e.g., a register $r1 allocated in the register space of the central processing unit CPU that is regularly used for normal operations by the program under test). As depicted, the contents of this register $r1 provide an address a1 that is cached by this register r1 for executing the »is modified« instruction as follows: ism $r1.

In a boxed section below, the structure and contents of the second memory structure are shown. The second memory includes three registers under control of the memory modification unit MEMOU. The three registers include, for example, a data register dm including n memory cells having contents that are generally referred to as $dm or individually by $d1, $d2, . . . $dn). This data register conforms to the data register DRG of FIG. 3. It is assumed that some arbitrary data d or 0 (zero) etc. are stored in the n memory cells $d1, $d2, . . . $dn of this data register $dm that are irrelevant for this exemplary embodiment.

The registers also include, for example, an address register am including n memory cells having contents that are generally referred to as $am or individually by $a1, $a2, . . . $an. This address register conforms to the data address register ARG of FIG. 3. It is assumed that some arbitrary addresses a8, a3, or 0 (zero) are stored in the n memory cells $a1, $a2, . . . $an of this address register $am that are irrelevant for this exemplary embodiment.

The three registers also include, for example, a modification indication register im including one memory cell with a content of $im. This modification indication register conforms to the modification indication register IRG of FIG. 3. It is assumed that a value of d is stored in the memory cell $im of the modification indication register im, whereby this arbitrary value d has remained since the latest call of the »is modified« instruction.

The »is modified« instruction begins with reading the contents of register $r1 and passing the contents (e.g., the address al to a query for a presence of this address al in the address register $am). In the course of executing the »is modified« instruction ism $r1, the memory modification unit sets the modification indicator $im from a former arbitrary value of d (see contents of modification indication register $im on the left side) to a value of 0 (zero) (see contents of modification indication register $im on the right side) since the queried address al is not included in the set of addresses {a8, a3} of the address register $am. Since a1 is not within this set of the address register $am, the memory cell $im of the modification indication register $im is set to a value of 0 (zero).

In a boxed section below, the structure and contents of the first memory structure used for accessing the usual operands administered by the program are shown. The first memory structure, either main memory or register space, is allocated by the program for storing at least one operand of the program; each operand is stored in a first memory cell by an associated address a1, a2, a3 in the first memory structure.

The first memory structure includes in a commonly known manner a number of memory cells addressed by addresses a1, a2, a3, . . . including logical or virtual addresses used under control of commonly known memory mapping facilities controlled by the central processing unit CPU.

The respective contents of the depicted memory cells of the first memory structure are specified by an arbitrary data value d in the drawing, providing that the arbitrary data values d are irrelevant for this exemplary embodiment.

Figure 7:
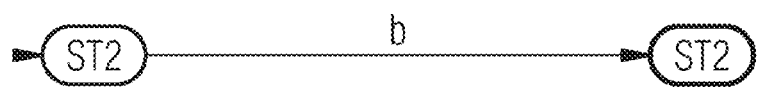
FIG. 7 shows details of a second state transition.

FIG. 7 shows details of the second state transition b in the course of executing the »is modified« instruction. Contrary to the situation depicted by FIG. 5, the second state transition b is starting in the second state ST2. In the second state ST2 a memory cell at a given address is modified, or, in other words, there is a shadow operand for a given operand stored in a given address. Accordingly, an »is modified« instruction query will deliver a value unequal to zero, providing that a shadow operand is present. As the »is modified« query does not affect the presence of a shadow operand, the »is modified« instruction does not lead to a state transition. The state remains unaltered at the second state ST2.

Figure 8:
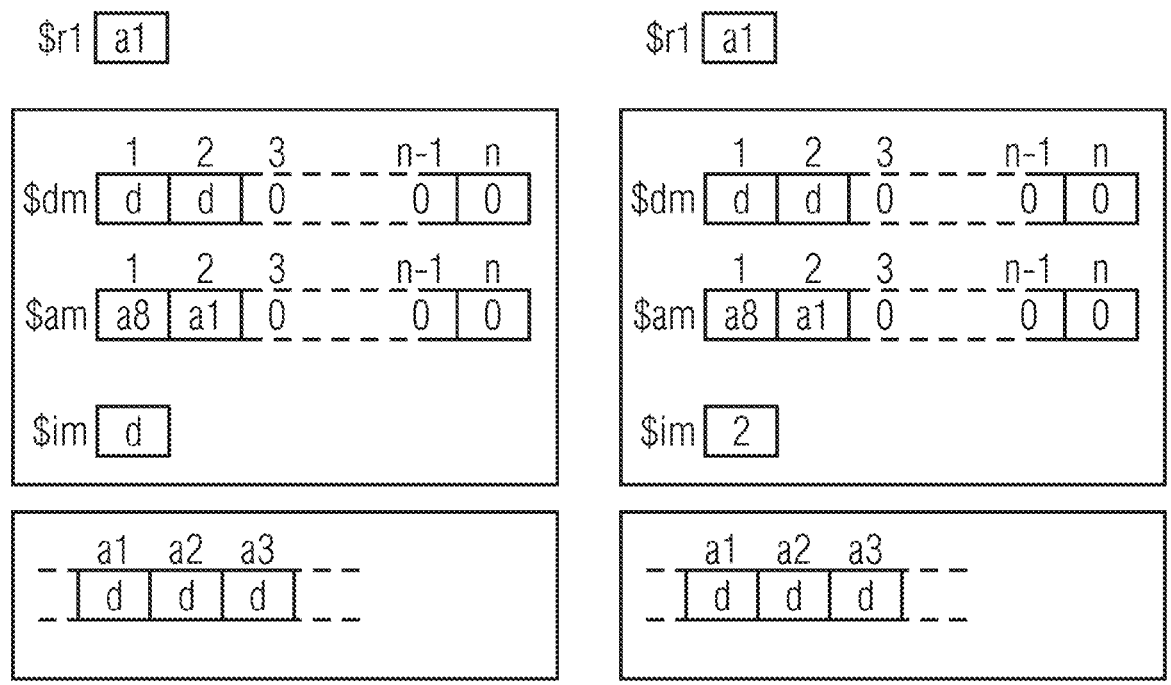
FIG. 8 shows amendments in a memory structure as a result of the second instruction.

FIG. 8 shows amendments in memory structures before (left section) and after (right section) the second state transition b depicted in the subsequent FIG. 7.

The contents $r1 of register r1 allocated in the register space of the central processing unit CPU provides an address al that is cached by this register r1 for executing the »is modified« instruction as follows: ism $r1

The second memory in the boxed section below including the three registers under control of the memory modification unit MEMOU is depicted in accordance with the structure of FIG. 6. The three registers are assumed to store the following data.

The contents $dm of the data register dm are assumed to include the same arbitrary data d or 0 (zero) etc. in respective memory cells $d1, $d2, . . . $dn, as shown in FIG. 6, which are again irrelevant for this exemplary embodiment.

The contents $am of the address register am are assumed to store addresses a8, a1 or 0 (zero) in respective memory cells $a1, $a2, . . . $an.

The modification indication register im is assumed to store a value of d in its memory cell $im of the modification indication register im, whereby this arbitrary value d has remained since the latest call of the »is modified« instruction.

The »is modified« instruction begins with reading the contents $r1 of register $r and passing the contents (e.g., the address al to a query for a presence of this address a1 in the address register $am). In the course of executing the »is modified« instruction ism $r1, the memory modification unit sets the modification indicator $im from a former arbitrary value of d (see contents of modification indication register $im on the left side) to a value of 2 (see contents of modification indication register $im on the right side), since the queried address a1 is included in memory cell $a2 of the address register $am.

The boxed section below depicts the contents of the first memory structure that is again irrelevant for this exemplary embodiment.

FIG. 9 shows details of the third state transition c in the course of executing the »store modified« instruction.

According to an embodiment, processing a shadow operand is generally preceded by querying of data instructive of reading or writing a shadow operand. In order to store a shadow operand by a »store modified« instruction using a given address, it is to be checked before, whether a shadow operand already exists under this given address. This check is previously performed by the »is modified« instruction.

This provides that the third transition c is preceded by the first transition a starting in a first state ST1, in which a memory cell at a given address is not modified, or, in other words, there is no shadow operand for a given operand stored in a given address. Accordingly, an »is modified« instruction ism $r2 query will deliver a value of 0 (zero), providing that no shadow operand is present. The »is modified« instruction, consequently, does not lead to a state transition. The state remains unaltered at the first state ST1. This is shown in the middle of FIG. 9.

The subsequent third state transition c is changing from the first state ST1 into the second state ST2. This third state transition c is effected by the instruction [$im=0] stm $r1, $r2

The preceding portion [$im=0] of this instruction is a condition or a state transition guard, safeguarding that the remaining portion stm $r1, $r2 is only executed when the returned value of the »is modified« query is 0 (zero). The following »store modified« instruction stm $r1, $r2 includes two operands that are held in the contents of the first register $r1 and the second register $r2. The first operand in register r1 is a data value of the shadow operand to be stored. The second operand of the »store modified« instruction specifies the contents $r2 of register r2 as address of a memory cell in the second memory structure in which the shadow operand is to be stored.

FIG. 10 shows amendments in memory structures before the first state transition a—left section—, after the first state transition a (e.g., centric section), and after the third state transition c (e.g., right section) depicted in the subsequent FIG. 9.

In the upper part of all three sections the contents of a memory structure for program execution are shown (e.g., a first register $r1 and a second register $r2 allocated in the register space of the central processing unit CPU both of which are regularly used for normal operations by the program under test).

As depicted, the contents $r1 of the first register r1 provides a data value that is to be stored as a shadow operand, or a modified value, and is currently cached by the first register r1. The contents $r2 of the second register r2 provide an address a1 for a memory cell in the second memory structure that is currently cached by the second register r2.

After execution of the »is modified« instruction, ism $r2, amendments in the memory structures are shown in the centric section, which are analogously corresponding with the contents of the second memory structure shown in the right section of FIG. 6 after an analogous execution of the »is modified« instruction.

After execution of the »store modified« instruction, stm $r1, $r2 amendments in the memory structures are shown in the right section.

The »store modified« instruction has amended the contents $a3 of memory cell a3 within the address register $am by a value of a1 that is the address of the shadow operand passed by the contents $r2 of the second register r2.

The »store modified« instruction has further amended the contents $d3 of memory cell d3 within the data register dm by a value of d4 that is the data value of the shadow operand passed by contents $r1 the first register r1. The index 3 of the memory cell $d3 within the data register $dm is equal to the index of the memory cell $a3 within the address register $am, which determines the position of the saved shadow operand d3 within the data register $dm.

The »store modified« instruction has amended the contents $im of memory cell im within the modification indication register im by a value of 3, which is the position of the memory cell $a3 recently modified.

In a boxed section below, where the structure and contents of the first memory structures used for accessing operands of the program is shown, a data value d1 for the operand under the address a1 is stored. This data value d1 is the data value of the operand for which a respective shadow operand with a value of d4 is stored in the second memory structure.

FIG. 11 shows details of the fourth state transition d in the course of executing the »load modified« instruction.

According to an embodiment, processing a shadow operand is generally preceded by querying of data instructive of reading or writing a shadow operand. In order to load a shadow operand by a »load modified« instruction using a given address, it is to be verified before whether an existing shadow operand is associated with the given address. This check is previously performed by the »is modified« instruction.

This provides that the fourth transition d is preceded by the second transition b starting in a second state ST2, in which a memory cell at a given address is modified, or, in other words: there is a shadow operand for a given operand stored in a given address. Accordingly, an »is modified« instruction ism $r2 query will deliver a value of unequal zero, providing that a shadow operand is present. The »is modified« instruction, consequently, does not lead to a state transition. The state remains unaltered at the second state ST2. This is shown in the middle of FIG. 11.

The subsequent fourth transition d is not changing the present second state ST2. This fourth transition d is effected by the instruction [$im≠0] ldm $r1, $r2.

The preceding portion [$im 0] of this instruction is a condition or a state transition guard safeguarding that the remaining portion ldm $r1, $r2 is only executed when the returned value of the »is modified« query is unequal zero.

The following »load modified« instruction ldm $r1, $r2 includes two operands that are held in contents $r1 of the first register r1 and the contents $r2 of the second register r2. The first operand in register $r1 is an arbitrary data value d that will be overwritten by the shadow operand to be loaded. The second operand of the »store modified« instruction specifies the contents $r2 of register r2 as address of a memory cell in the second memory structure from which the shadow operand is to be loaded.

FIG. 12 shows amendments in memory structures before the first state transition a (e.g., left section), after the first state transition a (e.g., centric section), and after the fourth state transition d (e.g., right section) depicted in the subsequent FIG. 11.

In the upper part of all three sections the contents of a memory structure for program execution are shown (e.g., a first register $r1 and a second register $r2 allocated in the register space of the central processing unit CPU, both of which are regularly used for normal operations by the program under test).

As depicted, the contents $r1 of the first register r1 provides an arbitrary data value d that will be overwritten by a shadow operand or modified value. The contents $r2 of the second register r2 provides an address a1 for a memory cell in the second memory structure that is currently cached by the second register $r2.

After execution of the »is modified« instruction, ism $r2 amendments in the memory structures are shown in the centric section, which are analogously corresponding with the contents of the second memory structure shown in the right section of FIG. 6 after an analogous execution of the »is modified« instruction.

The »is modified« instruction begins with reading the contents $r1 of register r1 and passing the contents (e.g., the address a1) to a query for a presence of this address a1 in the contents of the address register $am. In the course of executing the »is modified« instruction ism $r1, the memory modification unit sets the modification indicator $im from a former arbitrary value of d (see contents $im of modification indication register im on the left section) to a value of 3 (see contents $im of modification indication register im in the centric section) since the queried address a1 is included in memory cell $a3 of the address register $am.

After execution of the »load modified« instruction, ldm $r1, $r2, amendments in the memory structures are shown in the right section.

There are no amendments in the second memory structure including the data register $dm, the address register $am, and the modification indication register $im.

The »load modified« instruction uses the contents $im of modification indication register im with a value of 3 as index for accessing the contents $d3 of a data memory cell with index 3 in the data register dm, which contains the modified data or shadow operand to be loaded. The data value d4 of this shadow operand associated with the address a1 is loaded into the contents of the first register $r1.

In a boxed section below, where the structure and contents of the first memory structures used for accessing operands of the program is shown, a data value d1 for the operand under the address a1 is stored. This data value d1 is the data value of the operand for which a respective shadow operand with a value of d4 is stored in the second memory structure.

FIG. 13 shows details of the fifth state transition e in the course of executing the »load modified« instruction.

According to an embodiment, processing a shadow operand is generally preceded by querying of data instructive of reading or writing a shadow operand. In order to load an operand by a »load« instruction using a given address, it is to be falsified before, whether an existing shadow operand is associated with the given address. This check is previously performed by the »is modified« instruction.

This provides that the fourth transition d is preceded by the first transition a starting in a first state ST1, in which a memory cell at a given address is not modified, or, in other words, there is no shadow operand for a given operand stored in a given address. Accordingly, an »is modified« instruction ism $r2 query will deliver a value of unequal zero, providing that a shadow operand is present. The »is modified« instruction, consequently, does not lead to a state transition. The state remains unaltered at the first state ST1. This is shown in the middle of FIG. 13.

The subsequent fifth state transition e is not changing the present first state ST1. This fifth state transition e is effected by the instruction [$im=0] ld $r1, $r2.

The preceding portion [$im=0] of this instruction is a condition or a state transition guard, safeguarding that the remaining portion ld $r1, $r2 is only executed when the returned value of the »is modified« query is 0 (zero).

The following »load« instruction ld $r1, $r2 includes two operands that are held in the contents $r1 of the first register r1 and the contents $r2 of the second register r2. The first operand in register $r1 is an arbitrary data value d that will be overwritten by the operand to be loaded. The second operand of the »store modified« instruction specifies the contents $r2 of register r2 as address of a memory cell in the first memory structure from which the operand is to be loaded. The general difference between the »load« instruction and the »load modified« instruction described before is in that the »load« instruction does load an operand from the first memory while the »load modified« instruction loads a shadow operand from the second memory.

FIG. 14 shows amendments in memory structures before the first state transition a (e.g.,left section), after the first state transition a (e.g., centric section), and after the fifth state transition e (e.g., right section) depicted in the subsequent FIG. 11.

In the upper part of all three sections the contents of a memory structure for program execution are shown (e.g., a first register $r1 and a second register $r2 allocated in the register space of the central processing unit CPU, both of which are regularly used for normal operations by the program under test).

As depicted, the contents $r1 of the first register r1 provides an arbitrary data value d that will be overwritten by a data value of the operand. The contents $r2 of the second register r2 provides an address a1 for a memory cell in the first memory structure that is currently cached by the second register $r2.

After execution of the »is modified« instruction, ism $r2, amendments in the memory structures are shown in the centric section, which are analogously corresponding with the contents of the second memory structure shown in the right section of FIG. 6 after an analogous execution of the »is modified« instruction.

The »is modified« instruction begins with reading the contents of register $r1 and passing the contents (e.g., the address a1 to a query for a presence of this address a1 in the contents $am of address register am). In the course of executing the »is modified« instruction ism $r1, the memory modification unit sets the modification indicator $im from a former arbitrary value of d (see contents $im of modification indication register im on the left section) to a value of 0 (see contents $im of modification indication register im in the centric section) since the queried address a1 is not included in any memory of the address register $am.

After execution of the »load« instruction, ld $r1, $r2, amendments in the memory structures are shown in the right section. There are no amendments in the second memory structure including the data register dm, the address register am, and the modification indication register im.

The »load modified« instruction uses the contents $r2 of register r2 with a value of a1 for accessing a memory cell a3 in the first memory structure (e.g., boxed section below), where the structure and contents of the first memory structures used for accessing operands of the program is shown, which contains the data operand to be loaded. The data value d1 of this operand associated with the address a1 is loaded into the contents $r1 of the first register r1.

Figure 15:
FIG. 15 shows details of a sixth state transition.

FIG. 15 shows details of the sixth state transition f in the course of executing the »store« instruction.

The sixth state transition f is either effected in the first state ST1, where a shadow operand does not exist or in the second state ST2, where a shadow operand exists. Regardless of the initial state STi, a completion of the sixth state transition f remains in the initial state STi in the end state STi.

The sixth state transition f effected by the instruction st $r1, $r2

The »store« instruction st $r1 includes two operands that are held in the contents $r1 of the first register r1 and the contents $r2 of the second register r2. The operand in the contents $r1 of the first register r1 is a data value of the operand to be stored. The operand in the contents $r2 of the second register r2 specifies a target address of a memory cell in the first memory structure to which the operand is to be stored.

Figure 16:
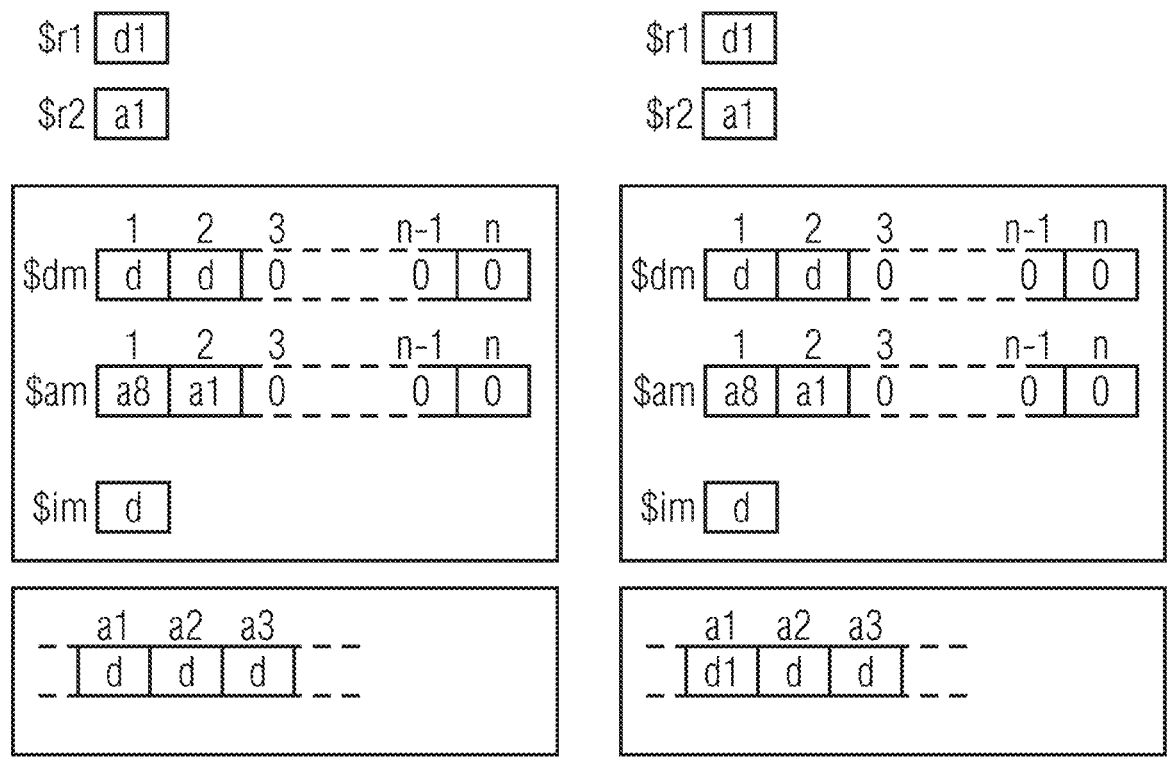
FIG. 16 shows amendments in a memory structure as a result of the sixth state transition.

FIG. 16 shows amendments in memory structures before (e.g., left section), and after (e.g., right section) the sixth state transition f depicted in the subsequent FIG. 15.

As depicted, the contents $r1 of the first register r1 provides a data value dl that is to be stored as an operand and is currently cached by the contents $r1 of the first register r1. The contents $r2 of the second register r2 provide an address a1 for a memory cell in the first memory structure that is currently cached by the second register $r2.

After execution of the »store« instruction, st $r1, $r2, amendments in the memory structures are shown in the right section. There are no amendments in the second memory structure including the data register dm, the address register am and the modification indication register im.

In a boxed section below, where the structure and contents of the first memory structures used for accessing operands of the program is shown, an arbitrary data value d for the operand under the address a1 is stored prior to execution of the »store« instruction, as shown in the left section of the undermost boxed area.

The »store« instruction has amended the contents of this memory cell (see right section of the undermost boxed area within the first memory structure) by a value of d1 that is the data value of the operand passed by the first register $r1.

FIG. 17 shows details of the seventh state transition g in the course of executing the »clear modification« instruction.

According to an embodiment, processing a shadow operand is generally preceded by querying of data instructive of reading or writing a shadow operand. In order to clear a modification, which provides that a relationship between an operand with a respective shadow operand is released or deleted, by a »clear modification« instruction using a given address, it is to be verified before, whether an existing shadow operand is associated with the given address. This check is previously performed by the »is modified« instruction.

The seventh state transition g is accordingly preceded by a second transition b starting in a second state ST2, in which a memory cell at a given address is modified, or, in other words, there is a shadow operand for a given operand stored in a given address. Accordingly, an »is modified« instruction ism $r1 query will deliver a value of unequal zero providing that a shadow operand is present. The »is modified« instruction, consequently, does not lead to a state transition. The state remains unaltered at the second state ST2. This is shown in the middle of FIG. 17.

The subsequent seventh state transition g is not changing the present second state ST2. This seventh state transition g is effected by the instruction [$im≠0] clm $r1.

The preceding portion [$im≠0] of this instruction is a condition or a state transition guard safeguarding that the remaining portion clm $r1 is only executed when the returned value of the »is modified« query is unequal zero.

The following »clear modified« instruction clm $r1 includes one operand held in the first register $r1. The operand in register $r1 has a data value of a1, which is an address of a memory cell in the second memory structure, for which an »is modified« state is to be cleared.

FIG. 18 shows amendments in memory structures before the second state transition b (e.g., left section), after the second state transition b (e.g., centric section) and after the seventh state transition g (e.g., right section) depicted in the subsequent FIG. 17.

As depicted, the contents of the first register $r1 provides an address a1 for an operand having an association with a shadow operand that is to be released or deleted.

After execution of the »is modified« instruction, ism $r1, amendments in the memory structures are shown in the centric section. The »is modified« instruction begins with reading the contents $r1 of register r1 and passing the contents (e.g., the address al to a query for a presence of this address al in the address register $am).

In the course of executing the »is modified« instruction ism $r1, the memory modification unit sets the modification indicator $im from a former arbitrary value of d (see contents $im of modification indication register im on the left section) to a value of 3 (see contents $im of modification indication register im in the centric section) since the queried address al is included in memory cell $a3 of the address register $am.

After execution of the »clear modification« instruction, clm $r1, $r2 amendments in the memory structures are shown in the right section.

The »clear modified« instruction uses the contents $im of modification indication register im with a value of 3 as index for accessing an address memory cell $a3 with index 3 in the address register $am. The former data value a1 (e.g., the address of the modified data or shadow operand associated with the operand for the same address a1) contained in this address memory cell $a3 is overwritten by a value of 0 (zero) in the course of executing the »clear modified« instruction. In parallel, the former data value 3 contained in the modification indication register $im is overwritten by a data value of 0 (zero).

There are no changes in memory cells of the first memory structure (see a boxed section below).

Turning back to FIG. 2, a number of embodiments are described, where the access of shadow operands is not operated within registers of the central processing unit CPU but in the main memory MEM.

An advantage of embodiments according to FIG. 2, compared with embodiments having a memory organization shown in FIG. 1, is obviously due to a larger available memory space of the second memory structure that is not limited to a register space according to embodiments of FIG. 1.

Due to the larger memory space of the second memory structure, each operand, accessible in the main memory MEM by the program, may be associated by a respective shadow operand that is equally accessible in the main memory MEM so that within the main memory space, an equal number of memory cells for storing shadow operands, or modified data values, and memory cells for storing operands, or unmodified data values, is provided.

Although embodiments according to FIG. 2 extend the storage space of the modifiable memory area, the embodiments may slow down execution times of an otherwise identical program that is due to a lower access time of memory cells in the main memory MEM compared to the faster access time of memory cells a register. Depending on the job at hand, a balance between the storage space of the modifiable memory and the access time will either favor implementations according to FIG. 1 described below or implementations according to FIG. 2 described hereinafter.

Another important difference is that embodiments according to FIG. 2 enable data seeding and fault injection into programs that have not been amended by memory modification unit MEMOU functionality in terms of compiling and/or linking the program with program code providing the memory modification unit MEMOU functionality for allocating a delimited memory structure, providing for registers or other memory cells under the control of the memory modification unit MEMOU, and providing extended instructions for accessing or administering a shadow variable instead of a variable.

Figure 21:
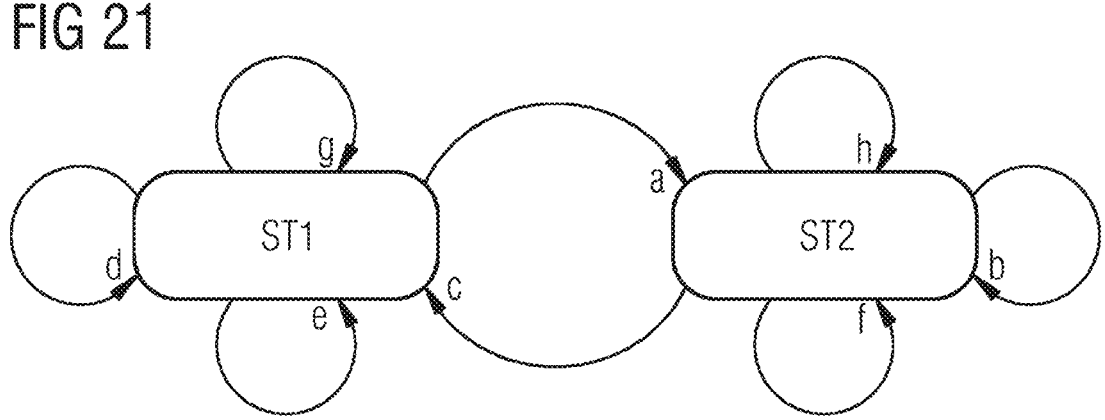
FIG. 21 shows a state transition diagram for illustrating possible state transitions according to an alternative embodiment.

Referring to FIG. 21, showing a state transition diagram for illustrating possible state transitions according to embodiments of the memory modification unit MEMOU, where the first memory structure and the second memory structure are located within the main memory MEM.

Figure 4:
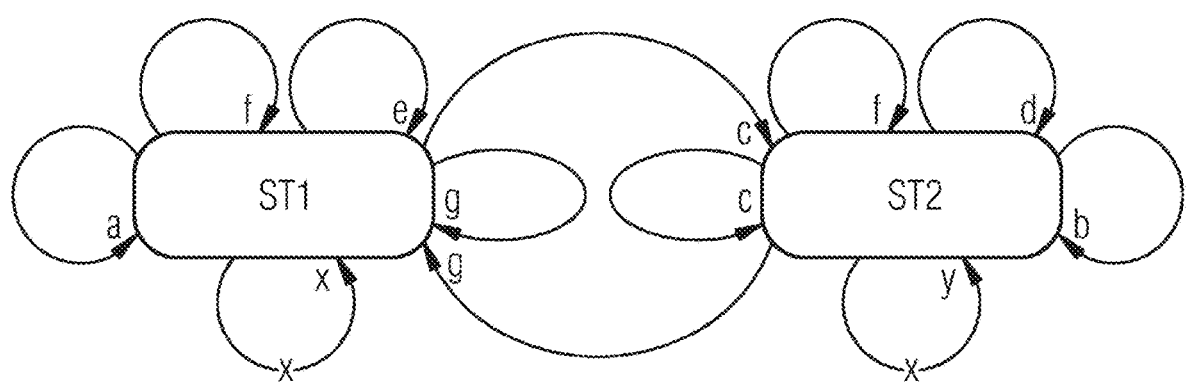
FIG. 4 shows a state transition diagram for illustrating possible state transitions according to an embodiment.

In conformance with the state transition diagram according to FIG. 4, the state transition diagram according to FIG. 21 defines two similar states ST1, ST2. A first state ST1 is characterized in that a memory cell at a given address is not modified, in other words, there is no shadow operand for a given operand stored in a given address. A second state ST2 is characterized in that a memory cell at a given address is modified: in other words, there is a shadow operand for a given operand stored in a given address.

Within the first state ST1, a query of whether a shadow operand, or modified data, is present would return a negative result or a »zero mark«, which is explained below. Within the second state ST2, a query of whether a shadow operand, or modified data, is present would return a positive result that is unequal to the zero mark.

A »zero mark« is hereinafter denoted by an asterisk »*«. The zero mark * that indicates a non-modification is a special value that is not in the range of any data value.

The zero mark * may be realized in different ways. For example, for one bit per modifiable memory cell: 0 (zero) provides that the memory cell is not modified; and, 1 provides that the memory cell is modified. As another example, indirect addressing may be used (e.g., a memory cell contains an address, and this address refers either to a memory cell with unmodified data, (such as to the »original« memory cell, or to a memory cell with the modified data).

Unlike the state transition diagram according to FIG. 4, the state transition diagram according to FIG. 21 adds only two particular memory access instructions that are necessary for operating shadow operands along with the operands regularly used by the program. The two particular memory access instructions include a »store modified« instruction stm and a clear modification clm instruction.

These instructions and corresponding interplay with usual memory instructions (e.g., »store« or st and »load« or ld) are influencing a state transition a, b, c, d, e, f, g, h, as explained below.

The latter »usual« memory instructions refer to general instructions of accessing memory by the program under test which are extended with respect to corresponding semantics and functionality, as shown below.

All instructions described below refer to a given adress addr that is passed as an operand addr for the given opcode of the instructions explained below.

a) A first state transition a is changing from the first state ST1 into the second state ST2. This first state transition a is effected by the instruction stm, addr, where stm is the instruction for storing a shadow operand or modified data value. The instruction with an opcode »stm« includes two operands, where the first operand is characterized by a place holder, which provides that the first operand does not affect the outcome of the instruction. The second operand of the stm instruction specifies an address addr of a memory cell.

b) A second state transition b is remaining in the second state ST2. This first state transition a is effected by the instruction stm, addr, which is the same as the instruction effecting the first state transition a, as described above.

c) A third state transition c is changing from the second state ST2 into the first state ST1. This second state transition a is effected by the instruction clm addr, where clm is the instruction for clearing an »is modified« state for a memory cell with the specific address addr.

d) A fourth state transition d remaining in the first state ST1 is effected by the instruction clm addr that is to the same as the instruction effecting the third state transition c, as described above.

e) A fifth state transition e remaining in the first state ST1 is effected by the instruction ld, addr, where ld is the instruction for loading an operand from a memory cell with the specific address addr. The first argument of the load instruction ld is specified by a placeholder since the target address of the load instruction does not affect the outcome of the instruction.

f) A sixth state transition f remaining in the second state ST2 is effected by the instruction ld, addr, which is the same as the instruction effecting the fifth state transition e as described above.

g) A seventh state transition g remaining in the first state ST1 is effected by the instruction st, addr, where st is the instruction for storing an operand. The target address addr of the memory cell into which the operand is to be stored is specified by the second argument addr. The first argument of the store instruction st is specified by a placeholder since this does not affect the outcome of the instruction.

h) An eighth state transition h remaining in the second state ST2 is effected by the instruction st, addr, which is the same as the instruction effecting the seventh state transition g, as described above.

Figure 19:
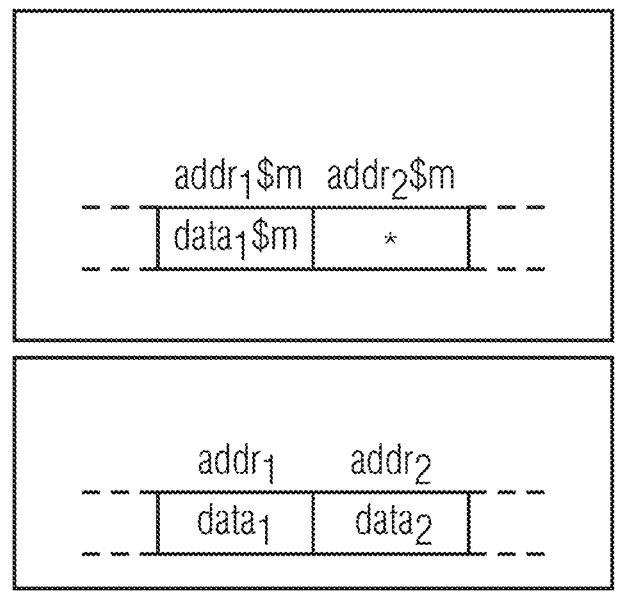
FIG. 19 shows an exemplary memory structure according to a first variant of an alternative embodiment.
Figure 20:
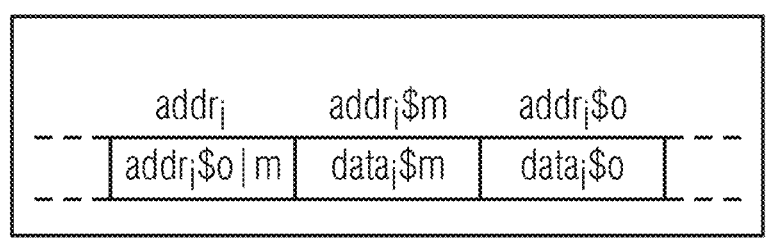
FIG. 20 shows an exemplary memory structure according to a second variant of an alternative embodiment.

A specific description of these state transitions a, b, c, d, e, f, g, h is continued for embodiments referred to in FIG. 19 and FIG. 20.

FIG. 19 shows an exemplary memory structure, wherein the first memory structure and the second memory structure are located within the main memory MEM according to a first variant.

The memory structure according to this first variant includes a first memory structure in a boxed section on top of FIG. 19 and a second memory structure in a boxed section on top of FIG. 19, both located within the main memory MEM.

The memory cells for an access of shadow operands within the second memory structure in the boxed section on top of FIG. 19 are addressed by an address addri$m of a modified memory cell, where i is an index for respectively addressed memory cell and where an appendix »m«, a short for »modified«, is attached to addresses of modified memory cells and modified data values or shadow operands. In FIG. 19, addresses addr1$m, addr2$m of two memory cells are depicted. The first memory cell addr1$m contains a modified data value data1$m of a shadow operand, whereas the second memory cell addr2$m contains a zero mark * that indicates that no shadow operand is present under the address addr2$m.

The memory cells for an access of operands within the first memory structure in the boxed section at the bottom of FIG. 19 are addressed by an address addri$o of memory cell, where i is an index for respectively addressed memory cell and where an appendix »o«, a short for »original«, is attached to addresses of memory cells and data values or operands. Alternatively, the addresses of operands within the first memory structure are simply noted as addri, which sufficiently distinguishes these address by an address of a modified memory cell. In FIG. 19, addresses addr1, addr2 of two memory cells are depicted. The first memory cell addr1 contains a data value data1 of an operand, and the second memory cell memory cell addr2 contains a data value data2 of an operand. The data value datai is a further short form of the expression datai$o.

In the following, a complete set of instructions according to the first variant of this embodiment is specified. As in the previous embodiments, $r1 and $r2 identify microcontroller registers.

A first instruction uses the »store modified« semantics as follows: [true] stm $r1, $r2→st $r1, $r2$m.

The first portion of this instruction: [true]expresses a condition that is generally enclosed by square brackets[ . . . ]. The expression [true] denotes a condition that is always valid. An arrow »→« denotes a term replacement, whereby the term on the left side of the arrow is replaced by the term on the right side of the arrow. $m is again a short for »modified«. The expression $r2$m refers to the modified memory cell (e.g., addr$m). The outcome of this instruction is, that a modified data value is always stored in the modified memory cell.

This instruction covers the first state transition a and the second state transition a,b depicted in FIG. 21. The first state transition a is executed by storing a modified value for a previously unmodified value, or, in other words, by storing a shadow operand under a given address, for which a shadow operand did not exist previously. The second state transition b is executed by storing a modified value for a previously modified value, or, in other words, by storing or rewriting a shadow operand under a given address, for which a shadow operand already exists.

A second instruction uses the »clear modification« semantics as follows: [true] clm $r1→st *, $r1$m.

This instruction covers the third state transition c and the fourth state transition d depicted in FIG. 21.

The second instruction always stores the zero mark * in the modified memory cell $r1$m indicating that the modification has been taken back.

A third instruction uses the »load« semantics as follows: [$r2$m=*] ld $r1, $r2→ld $r1, $r2$o $r2$o refers to the original (unmodified) memory cell, having an address addr or, identically, addr$o. This instruction covers the fifth state transition e depicted in FIG. 21.

The first portion of this instruction: [$r2$m=*] expresses a condition in that the remaining portion of this instruction is only executed, when for the address addr in register $r2, no modified data value is present (e.g., when the contents in a memory cell for this address return a zero mark). If this condition is true, then the unmodified or original data value is loaded.

A fourth instruction uses the »load« semantics as follows: [$r2$m *] ld $r1, $r2→ld $r1, $r2$m This instruction covers the sixth state transition f depicted in FIG. 21.

[$r2$m≠*] expresses a condition in that the remaining portion of this instruction is only executed when, for the address addr in register $r2, a modified data value is present (e.g., when the contents in a memory cell for this address does not return a zero mark). If this condition is true, then the modified data value is loaded.

A fifth instruction uses the »store« semantics as follows: [true] st $r1, $r2→st $r1, $r2$o.

This instruction covers the seventh state transition g, and the eighth state transition h depicted in FIG. 21. The fifth instruction always stores the unmodified data value in the original memory cell.

FIG. 20 shows an exemplary memory structure, wherein the first memory structure and the second memory structure are located within the main memory MEM according to a second variant. Unlike the memory structure of FIG. 19, the memory structure of FIG. 20 is not organized in delimited sections for the first memory structure and the second memory structure. However, the basic principles are still valid: Memory cells belonging to a second memory structure hold modified data values, and memory cells belonging to a first memory structure hold original data values.

The memory organization according to FIG. 20 basically provides a multiplicity of (e.g., set of) three adjacent memory cells, each including an addressable address memory cell for indirectly addressing two data memory cells. The indirect addressing is either referencing a first data memory cell for accessing (e.g., storing, reading or overwriting) an unmodified data value or operand, or a second data memory cell for accessing (e.g., storing, reading or overwriting) a modified data value or shadow operand.

FIG. 20 shows only one part of the multiplicity of three adjacent memory cells:

A first address memory cell is addressed by an address addri. The contents of the address memory cell either provide an address addri$m of a modified memory cell, which is to be regarded as a memory cell of the second memory structure according to the nomenclature used in this specification, or an address addri$o of a not modified cell, which is to be regarded as a memory cell of the first memory structure according to the nomenclature used in this specification. The either-or-reference is depicted as addri$om for the contents of this first address memory cell, using a common operator.

A modified data memory cell is addressed by the address addri$m, where the contents of the modified data memory cell provide the modified data value datai$m.

An unmodified data memory cell is addressed by the address addri$o, where the contents of the unmodified data memory cell provide the unmodified data value datai$o.

In the following, a complete set of instructions according to the second variant is shown.

A first instruction uses the »store modified« semantics as follows: [true] stm $r1, $r2→st $r1, $r2$m; st $r2$m, $r2.

This instruction covers the first state transition a and the second state transition b depicted in FIG. 21.

The first portion of this instruction [true] denotes a condition that is always valid. An arrow »→« denotes a term replacement whereby the term on the left side of the arrow is replaced by the term on the right side of the arrow. The semicolon »;« chains 2 instructions in sequence.

The first part st $r1, $r2$m of the first instruction always stores a modified data value in the modified memory cell. Afterwards, by the chained instruction st $r1, $r2$m, an access to the memory cell is redirected to the memory cell with the modified value.

A second instruction uses the »clear modification« semantics as follows: [true] clm $r1→st $r2$o, $r2.

This instruction covers the third state transition c and the fourth state transition d depicted in FIG. 21.

The second instruction always redirects accesses to the memory cell to the memory cell (e.g., back to the original memory cell) containing the unmodified data value.

A third instruction uses the »load« semantics as follows: [true] ld $r1, $r2→ld $r3, $r2; ld $r1, $r3.

This instruction covers the fifth state transition e and the sixth state transition f depicted in FIG. 21.

The third instruction always resolves address indirection when accessing a memory cell. Afterwards, the data value from the »redirected« memory cell is loaded.

A fourth instruction uses the »store« semantics as follows: [true] st $r1, $r2→st $r1, $r2$o.

This instruction covers the seventh state transition g and the eighth state transition h depicted in FIG. 21.

The third instruction always stores an unmodified data value into the original memory cell.

The disclosed embodiments relate to a method for memory modification resulting in a test probe for examining a program under test substantially during run-time. The ability to inject faults or errors in order to test the reaction of the program to a fault in a particular state and to individually replace access to a regular operand by accessing a shadow operand allow for non-intrusive tests while the program is substantially executed in real-time and whereby the program itself is not substantially altered for testing purposes.

The disclosed embodiments provide for reliable statements on program behavior from non-intrusive tests that seed data or inject faults into the processor memory. It is not necessary to change a program under test on source code level to use instructions for accessing shadow operands. The program code or source code of a program to be tested is just compiled and/or linked together with a program code or source code providing the memory modification unit MEMOU functionality disclosed herein.

Still another advantage is in that existing programs not using the instructions for accessing shadow operands operate as usual. In other words, extending a program under test with instructions for accessing shadow operands, or, alternatively, using a central processing unit having hardware that is adapted for accessing shadow operands, is downward compatible.

The memory modification unit MEMOU has full access to the complete memory, including data sections and code sections granting for accessing memory cells independently of whether the memory cells contain data values or program instructions. Test tools and tools for finding fault reasons, which are also referred to as debuggers, may easily be integrated with program translators (e.g., including compiler, linker, loader) because all these tools are able to use common memory maps. Memory maps are files that map human-readable, symbolic names of memory cells to physical addresses of memory cells for accessing memory cells for the purpose of reading or loading and for writing or storing.

During manipulation, original data values and modified data values are both kept and accessible at the same time, in different places, in the first memory structure and in the second memory structure, respectively.

By applying the memory modification unit MEMOU, a behavior of automation and control programs (e.g., SIMATIC or CNC programs such as SINUMERIC) may be analyzed during development, in lab and in field operation, with tests that seed data or inject faults into program units at system levels without the need to recompile and redeploy the program under test. This saves development and test efforts, resulting in a reduction of costs and feedback cycles of programs to be developed or reengineered.

Functional safety standards of the IEC 61508 family highly recommend fault-injection tests for systems that are classified in the highest safety levels. The memory modification unit MEMOU makes fault-injection tests feasible, affordable, quick, and reliable.

As the complete memory of a processor is open, access to a memory modification unit MEMOU is to be secured. Modern operating systems offer for this purpose, for example, hierarchical protection domains (e.g., protection rings). In order to grant for secure operations, access to special memory regions via a memory modification unit MEMOU may be restricted to program code that runs in the most privileged ring 0 (kernel mode).

The elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for manipulating a program during execution for testing of the program in a computer during run-time, providing the program comprising compiling, linking, or compiling and linking first program code of the program to be tested with second program code including routines for allocating a delimited memory structure, providing for registers or other memory cells under the control of the second program code, and providing extended instructions for accessing or administering a shadow variable instead of a variable, the program being stored and comprising instructions to be executed by a processor of the computer, the method comprising:
   allocating a first memory structure for storing at least one operand of the program, each operand stored in a first memory cell by an associated first address in the first memory structure;
   allocating a second memory structure for storing at least one shadow operand that is a modified data value, such that a modified nature compared to an original operand is expressed, each shadow operand stored in a second memory cell by an associated second address in the second memory structure;
   loading one of the instructions for accessing a first memory cell by an associated first address;
   querying data instructive of reading or writing a shadow operand on occurrence of a regular instruction for accessing the first memory cell by the first address; and
   responsive to a positive querying of the data, using an associated second address for accessing a second memory cell of one of the second memory cells instead of the first memory cell.

2. The method of claim 1, wherein the second memory structure is allocated in a register memory included in the processor or administered by the processor.

3. The method of claim 1, wherein the second memory structure is allocated in a main memory administered by the processor.

4. The method of claim 1, wherein the second memory structure includes at least one memory cell for storing a modification indicator, the modification indicator indicating a presence or absence of at least one first address in the second memory structure.

5. The method of claim 4, wherein the querying of data instructive of reading or writing a shadow operand includes querying the modification indicator.

6. The method of claim 4, wherein the instructions include an instruction for reading, amending, or reading and amending the modification indicator.

7. The method of claim 1, wherein the second memory structure includes at least one memory cell for storing a first address of one or more operands of the at least one operand, for each of which a respective shadow operand is present.

8. The method of claim 1, wherein the second memory structure includes at least one memory cell for storing one or more shadow operands of the at least one shadow operand.

9. The method of claim 1, wherein the querying of data instructive of reading or writing a shadow operand includes an instruction for replacing an access of the operand by an access of the shadow operand.

10. The method of claim 1, wherein the querying of data instructive of reading or writing a shadow operand includes querying a presence of the first address in the second memory structure.

11. The method of claim 1, wherein the processor comprises components for carrying out the method.

* * * * *